(12) United States Patent
Clark et al.

(10) Patent No.: US 8,527,696 B1
(45) Date of Patent: Sep. 3, 2013

(54) SYSTEM AND METHOD FOR OUT-OF-BAND CACHE COHERENCY

(75) Inventors: Roy E. Clark, Hopkinton, MA (US); Humberto Rodriguez, Williamsburg, MA (US); Kiran Madnani, Framingham, MA (US); ChiiShing Lin, Chelmsford, MA (US); David L. Black, Acton, MA (US); Uday K. Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 297 days.

(21) Appl. No.: 12/570,720

(22) Filed: Sep. 30, 2009

(51) Int. Cl.
*G06F 12/00* (2006.01)
(52) U.S. Cl.
USPC ............................................. 711/113; 711/114
(58) Field of Classification Search
USPC .................................................. 711/113, 114
See application file for complete search history.

(56) References Cited

U.S. PATENT DOCUMENTS

| | | | |
|---|---|---|---|
| 2002/0152355 A1* | 10/2002 | Otterness et al. | 711/114 |
| 2003/0177330 A1* | 9/2003 | Idei et al. | 711/202 |
| 2004/0193796 A1* | 9/2004 | Takamoto et al. | 711/113 |
| 2005/0071338 A1* | 3/2005 | Sugioka | 707/9 |
| 2006/0004957 A1* | 1/2006 | Hand et al. | 711/113 |
| 2008/0270727 A1* | 10/2008 | Jacobson et al. | 711/168 |

* cited by examiner

*Primary Examiner* — Hashem Farrokh
(74) *Attorney, Agent, or Firm* — Brian J. Colandreo; Pamela K. Soggu; Holland & Knight LLP

(57) ABSTRACT

A method and computer program product for receiving a data read request on a first array in a multi-array storage network. If the requested data is resident on the first array, the requested data is obtained from a storage device included within the first array. If not, the requested data is obtained from a storage device included within an at least a second array via an out-of-band cache control process. A method and computer program product for receiving a data write request on a first array for data to be stored on a multi-array storage. The data write request is processed to determine if the data is to be stored on the first array or on at least a second array. If the data is to be stored on the at least a second array, the data is stored via an out-of-band cache control process.

18 Claims, 3 Drawing Sheets

SYSTEM AND METHOD FOR OUT-OF-BAND CACHE COHERENCY

TECHNICAL FIELD

This disclosure relates to cache coherency and, more particularly, to out-of-band cache coherency.

BACKGROUND

Enabling multiple arrays to expose a single coherent image of one or more logical units may be done with in-band caching devices. For example, a caching device may be placed in front of each array and may manage the coherency between each caching device and their corresponding array. Unfortunately, the problem with this arrangement is that servers accessing the data may no longer see the personality of the array but may only see the personality of a new caching device. This, in turn, may adversely impact the general and fault management software of the system.

Alternatively, the caching logic of the in-band caching device may be embedded within the array itself and, in particular, within the array software stack. Unfortunately, the problem with this approach is the increased complexity of the software stack within the array. Specifically, increased code path lengths may lead to lower performance and more error-prone designs.

SUMMARY OF DISCLOSURE

In one implementation of this disclosure, a computer-implemented method includes receiving a data read request on a first array for requested data stored on a multi-array storage network that includes the first array and at least a second array. The data read request is processed to determine if the requested data is resident on the first array. If the requested data is resident on the first array, the requested data is obtained from a storage device included within the first array. If the requested data is not resident on the first array, the requested data is obtained from a storage device included within the at least a second array via an out-of-band cache control process.

One or more of the following features may be included. Processing the data read request to determine if the requested data is resident on the first array may include one or more of: determining if the requested data is resident on a cache storage device included within the first array; and determining if the requested data is resident on a data storage device included within the first array.

Obtaining the requested data from a storage device included within the first array may include one or more of: obtaining the requested data from a cache storage device included within the at least a second array; and obtaining the requested data from a data storage device included within the at least a second array.

Obtaining the requested data from a storage device included within the at least a second array via an out-of-band cache control process may include one or more of: obtaining the requested data from a cache storage device included within the at least a second array; and obtaining the requested data from a data storage device included within the at least a second array.

Processing the data read request to determine if the requested data is resident on the first array may include: processing a data location table to determine the location of the requested data within the multi-array storage network. At least one of the storage device included within the first array and the storage device included within the at least a second array may be an electromechanical storage device.

In another implementation of this disclosure, a computer program product resides on a computer readable medium and has a plurality of instructions stored on it. When executed by a processor, the instructions cause the processor to perform operations including receiving a data read request on a first array for requested data stored on a multi-array storage network that includes the first array and at least a second array. The data read request is processed to determine if the requested data is resident on the first array. If the requested data is resident on the first array, the requested data is obtained from a storage device included within the first array. If the requested data is not resident on the first array, the requested data is obtained from a storage device included within the at least a second array via an out-of-band cache control process.

One or more of the following features may be included. Processing the data read request to determine if the requested data is resident on the first array may include one or more of: determining if the requested data is resident on a cache storage device included within the first array; and determining if the requested data is resident on a data storage device included within the first array.

Obtaining the requested data from a storage device included within the first array may include one or more of: obtaining the requested data from a cache storage device included within the at least a second array; and obtaining the requested data from a data storage device included within the at least a second array.

Obtaining the requested data from a storage device included within the at least a second array via an out-of-band cache control process may include one or more of: obtaining the requested data from a cache storage device included within the at least a second array; and obtaining the requested data from a data storage device included within the at least a second array.

Processing the data read request to determine if the requested data is resident on the first array may include: processing a data location table to determine the location of the requested data within the multi-array storage network. At least one of the storage device included within the first array and the storage device included within the at least a second array may be an electromechanical storage device.

In another implementation of this disclosure, a computer-implemented method includes receiving a data write request on a first array for data to be stored on a multi-array storage network that includes the first array and at least a second array. The data write request is processed to determine if the data is to be stored on the first array or the at least a second array. The data is stored on a storage device included within the first array. If the data is to be stored on the at least a second array, the data is stored on a storage device included within the at least a second array via an out-of-band cache control process.

One or more of the following features may be included. Storing the requested data on a storage device included within the at least a second array via an out-of-band cache control process may include: storing the data on a storage device included within the at least a second array via an out-of-band cache control process after the data grows cold.

Storing the requested data on a storage device included within the at least a second array via an out-of-band cache control process may include: storing the data on a data storage device included within the at least a second array via an out-of-band cache control process. Storing the data on a storage device included within the first array may include: storing the data on a cache storage device included within the first array.

In another implementation of this disclosure, a computer program product resides on a computer readable medium and has a plurality of instructions stored on it. When executed by a processor, the instructions cause the processor to perform operations including receiving a data write request on a first array for data to be stored on a multi-array storage network that includes the first array and at least a second array. The data write request is processed to determine if the data is to be stored on the first array or the at least a second array. The data is stored on a storage device included within the first array. If the data is to be stored on the at least a second array, the data is stored on a storage device included within the at least a second array via an out-of-band cache control process.

One or more of the following features may be included. Storing the requested data on a storage device included within the at least a second array via an out-of-band cache control process may include: storing the data on a storage device included within the at least a second array via an out-of-band cache control process after the data grows cold.

Storing the requested data on a storage device included within the at least a second array via an out-of-band cache control process may include: storing the data on a data storage device included within the at least a second array via an out-of-band cache control process. Storing the data on a storage device included within the first array may include: storing the data on a cache storage device included within the first array.

The details of one or more implementations are set forth in the accompanying drawings and the description below. Other features and advantages will become apparent from the description, the drawings, and the claims.

DETAILED DESCRIPTION OF THE PREFERRED EMBODIMENTS

System Overview

Figure 1:
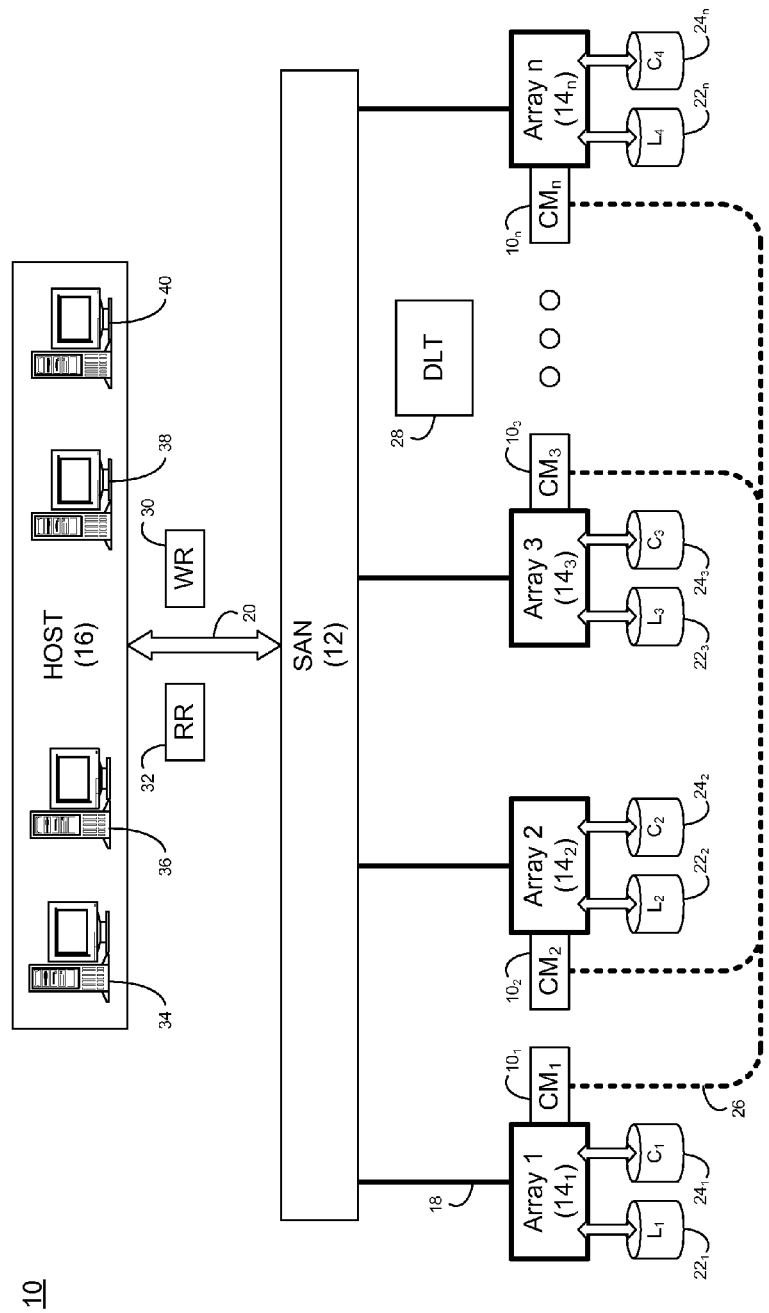
FIG. 1 is a diagrammatic view of a out-of-band cache coherency process executed in whole or in part by devices coupled to a distributed computing network.

Referring to FIG. 1, there is shown out-of-band cache coherency process 10. Out-of-band cache coherency process 10 may include one or more cache management processes $10_1$, $10_2$, $10_3$ & $10_n$. Accordingly and for the following discussion, the out-of-band cache coherency process will be described/discussed generally as out-of-band cache coherency process 10, with the understanding that out-of-band cache coherency process 10 may comprise one or more of cache management processes $10_1$, $10_2$, $10_3$ & $10_n$.

Out-of-band cache coherency process 10 may be utilized within a multi-array storage network, an example of which may include but is not limited to storage area network (SAN) 12. SAN 12 may be a dedicated storage system that may connect numerous geographically dispersed storage resources (e.g., storage arrays $14_1$, $14_2$, $14_3$ & $14_n$) to e.g., host 16. SAN 12 may provide block-level access to electronic data via network 18 (e.g., an ethernet network, a fiber channel network, an InfiniB and network, or any other circuit switched/packet switched network) using one or more SCSI-based protocols (e.g., Fiber Channel and iSCSI). Host 16 may be coupled to SAN 12 via network 20 (e.g., an ethernet network, a fiber channel network, or any other circuit switched/packet switched network).

Each of the individual storage arrays (e.g., storage arrays $14_1$, $14_2$, $14_3$ & $14_n$) included within SAN 12 may include a data storage device and a cache storage device. For example, storage array $14_1$ is shown to include data storage device $22_1$ and cache storage device $24_1$; storage array $14_2$ is shown to include data storage device $22_2$ and cache storage device $24_2$; storage array $14_3$ is shown to include data storage device $22_3$ and cache storage device $24_3$; and storage array $14_n$ is shown to include data storage device $22_n$ and cache storage device $24_n$.

Examples of data storage devices $22_1$, $22_2$, $22_3$ & $22_n$ may include but are not limited to a single hard disk drive, a plurality of hard disk drives, an array of hard disk drives, a single solid-state storage device, a plurality of solid-state storage devices, and an array of solid-state storage devices.

Examples of cache storage devices $24_1$, $24_2$, $24_3$ & $24_n$ may include but are not limited to a single hard disk drive, a plurality of hard disk drives, an array of hard disk drives, a single solid-state storage device, a plurality of solid-state storage devices, and an array of solid-state storage devices.

During operation of out-of-band cache coherency process 10, two or more of cache management processes $10_1$, $10_2$, $10_3$ and $10_n$ may communicate with each other via dedicated network 26 (e.g., an ethernet network, a fiber channel network, or any other circuit switched/packet switched network) or network 20 (described above) and may maintain data location table 28 (to be discussed below in greater detail).

Cache management process $10_1$ may be executed (in whole or in part) by storage array $14_1$ (e.g., a single server computer coupled to data storage device $22_1$ and cache storage device $24_1$, a plurality of server computers coupled to data storage device $22_1$ and a cache storage device $24_1$, or a RAID array including data storage device $22_1$ and cache storage device $24_1$).

The instruction sets and subroutines of cache management process $10_1$, which may be stored on a storage device (e.g., data storage device $22_1$, cache storage device $24_1$, a random access memory (RAM), or a read-only memory (ROM)) coupled to storage array $14_1$, may be executed by one or more processors (not shown) and one or more memory architectures (not shown) incorporated into storage array $14_1$.

Cache management process $10_2$ may be executed (in whole or in part) by storage array $14_2$ (e.g., a single server computer coupled to data storage device $22_2$ and cache storage device $24_2$, a plurality of server computers coupled to data storage device $22_2$ and a cache storage device $24_2$, or a RAID array including data storage device $22_2$ and cache storage device $24_2$).

The instruction sets and subroutines of cache management process $10_2$, which may be stored on a storage device (e.g., data storage device $22_2$, cache storage device $24_2$, a random access memory (RAM), or a read-only memory (ROM)) coupled to storage array $14_2$, may be executed by one or more processors (not shown) and one or more memory architectures (not shown) incorporated into storage array $14_2$.

Cache management process $10_3$ may be executed (in whole or in part) by storage array $14_3$ (e.g., a single server computer coupled to data storage device $22_3$ and cache storage device $24_3$, a plurality of server computers coupled to data storage device $22_3$ and a cache storage device $24_3$, or a RAID array including data storage device $22_3$ and cache storage device $24_3$).

The instruction sets and subroutines of cache management process $10_3$, which may be stored on a storage device (e.g., data storage device $22_3$, cache storage device $24_3$, a random access memory (RAM), or a read-only memory (ROM)) coupled to storage array $14_3$, may be executed by one or more processors (not shown) and one or more memory architectures (not shown) incorporated into storage array $14_3$.

Cache management process $10_4$ may be executed (in whole or in part) by storage array $14_4$ (e.g., a single server computer coupled to data storage device $22_4$ and cache storage device $24_4$, a plurality of server computers coupled to data storage device $22_4$ and a cache storage device $24_4$, or a RAID array including data storage device $22_4$ and cache storage device $24_4$).

The instruction sets and subroutines of cache management process $10_4$, which may be stored on a storage device (e.g., data storage device $22_4$, cache storage device $24_4$, a random access memory (RAM), or a read-only memory (ROM)) coupled to storage array $14_4$, may be executed by one or more processors (not shown) and one or more memory architectures (not shown) incorporated into storage array $14_4$.

Cache Management Process:

During operation of out-of-band cache coherency process 10, various data write requests (e.g., data write request 30) and data read requests (e.g., data read request 32) may be provided from host 16 to SAN 12 via network 20. As is known in the art, data write requests request that a specific piece of data be written to one of the storage arrays (e.g., storage arrays $14_1$, $14_2$, $14_3$ & $14_n$) included within SAN 12. Conversely, data read requests request that a specific piece of data be read from one of the storage arrays (e.g., storage arrays $14_1$, $14_2$, $14_3$ & $14_n$) included within SAN 12. Host 16 may include one or more servers (e.g., servers 34, 36, 38, 40) that may be geographically dispersed and SAN 12 may include storage arrays (e.g., storage arrays $14_1$, $14_2$, $14_3$ & $14_n$) that may also be geographically dispersed. Accordingly, storage array $14_1$ may be located proximate server 34; storage array $14_2$ may be located proximate server 36; storage array $14_3$ may be located proximate server 38; and storage array $14_n$ may be located proximate server 40. Therefore, the various data read requests and data write requests received and processed by the various components of SAN 12 may not be initially received by the appropriate component within SAN 12. For example, a data read request may be received by storage array $14_1$ for data stored on a storage device (e.g., data storage device $22_2$ or cache storage device $24_2$) coupled to storage array $14_2$. Accordingly, out-of-band cache coherency process 10 (via one or more of cache management processes $10_1$, $10_2$, $10_3$ & $10_n$.) may maintain data location table 28 to locate the various pieces of data stored within SAN 12.

Figure 2:
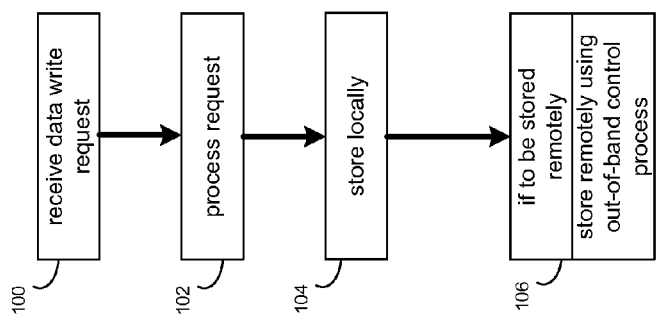
FIG. 2 is a flowchart of a portion of the out-of-band cache coherency process of FIG. 1.

Processing Data Write Requests:

Referring also to FIG. 2, out-of-band cache coherency process 10 (via one or more of cache management processes $10_1$, $10_2$, $10_3$ & $10_n$.) may receive 100 data write request 30 on a first array (e.g., storage array $14_1$) for data to be stored on SAN 12. Out-of-band cache coherency process 10 may process 102 data write request 30 to determine if the data is to be stored on the first array or some other array within SAN 12 (e.g., one of storage arrays $14_2$, $14_3$ & $14_n$). The data may be stored 106 on a storage device (e.g., cache storage device $24_1$) included within storage array $14_1$. If the data is to be stored on some other array within SAN 12 (e.g., one of storage arrays $14_2$, $14_3$ & $14_n$), the data may stored on a storage device included within the other storage array via an out-of-band cache control process.

Specifically and for illustrative purposes, assume that data write request 30 is a request to store "File X" within SAN 12. Assume for the first portion of this example that data write request 30 is provided to storage array $14_1$ and requests that "File X" be stored on storage array $14_1$. Upon receiving 100 data write request 30, out-of-band cache coherency process 10 (via e.g., cache management process $10_1$) may process 102 data write request 30 to determine if "File X" is to be stored on storage array $14_1$ or some other array within SAN 12 (e.g., one of storage arrays $14_2$, $14_3$ & $14_n$).

As discussed above and in this particular example, "File X" is to be stored on storage array $14_1$. Regardless of whether "File X" is to be stored on storage array $14_1$ or some other array within SAN 12 (e.g., one of storage arrays $14_2$, $14_3$ & $14_n$), cache management processes $10_1$ may immediately store 104 "File X" on a storage device (e.g., cache storage device $24_1$) included within storage array $14_1$. Cache management process $10_1$ may modify data location table 28 to define the location of "File X' within SAN 12 as cache storage device $24_1$.

If "File X" (which is currently stored on cache storage device $24_1$) has not been accessed for a period of time sufficient to deem the continued storage of "File X" within cache storage device $24_1$ unnecessary, cache management processes 10 may deem "File X" to have grown cold and may destage "File X" to a non-cache storage device (i.e., a data storage device). Since, in this example, "File X" is to be stored on storage array $14_1$, cache management processes $10_1$ may destage and store "File X" onto data storage device $22_1$. Cache management process $10_1$ may modify data location table 28 to define the new location of "File X' within SAN 12 as data storage device $22_1$.

As discussed above, if "File X" is to be stored on some other array within SAN 12 (e.g., one of storage arrays $14_2$, $14_3$ & $14_n$), "File X" may be stored on a storage device included within the other storage array via an out-of-band cache control process. For this particular disclosure, an out-of-band cache control process is a process that removes all or a portion of the cache control functionality from the data path within SAN 12. For example, if "File X" is stored on a storage array other than the storage array on which "File X" was received, dedicated network 26 may be utilized to transfer "File X' to the other array.

Assume for this portion of this example that "File X" was not to be stored on storage array $14_1$ and was actually to be stored on storage array $14_3$. If "File X" (which is currently stored on cache storage device $24_1$) has not been accessed for a period of time sufficient to deem the continued storage of "File X" within cache storage device $24_1$ unnecessary, cache management processes $10_1$ may deem "File X" to have grown cold and may destage "File X" to a non-cache storage device (i.e., a data storage device) included within storage array $14_3$. Since, in this example, "File X" is to be stored on storage array $14_3$, cache management processes $10_1$ may destage and store "File X" onto data storage device $22_3$ via an out-of-band cache control process and may provide "File X" to storage array $14_3$ via dedicated network 26 (or network 18). Cache management process $10_1$ may modify data location table 28 to define the location of "File X' within SAN 12 as data storage device $22_3$.

Figure 3:
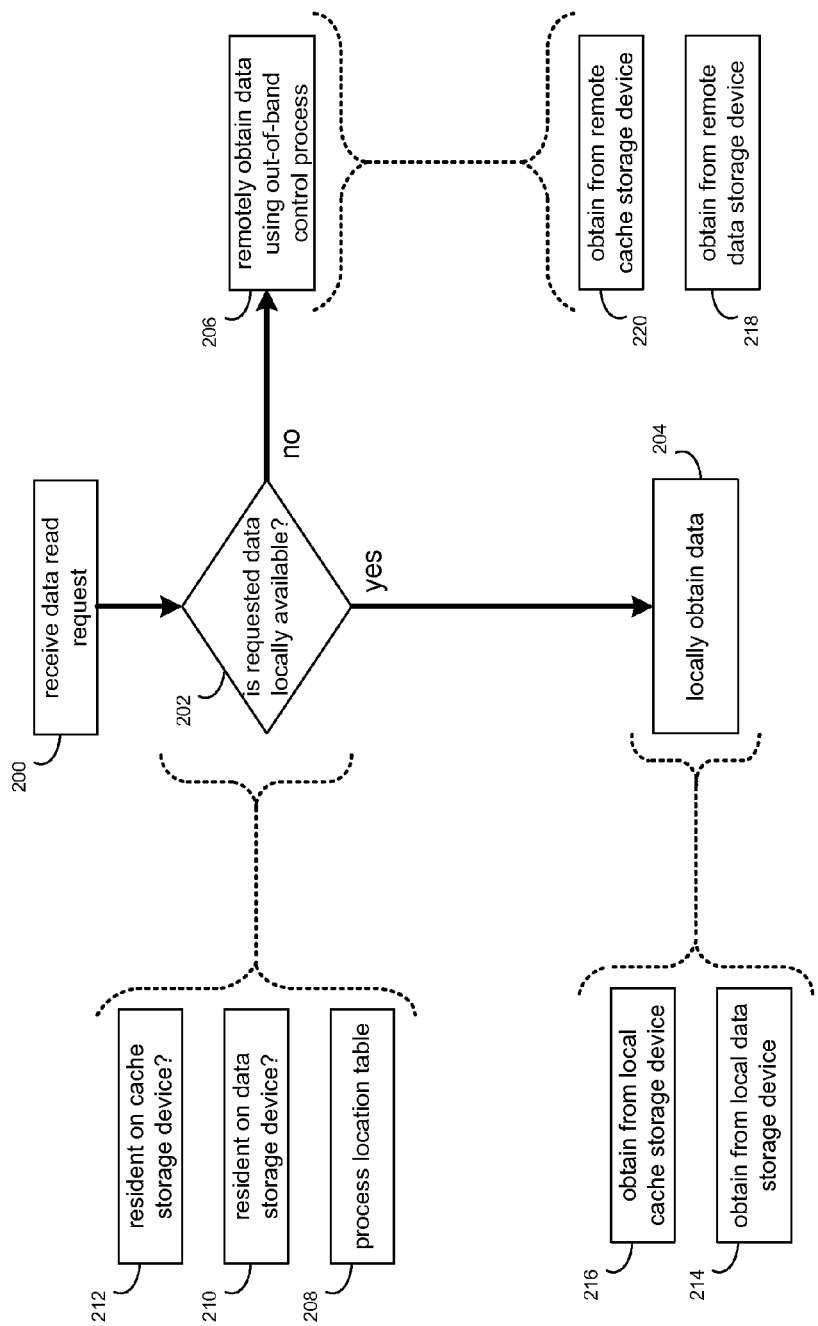
FIG. 3 is a flowchart of a portion of the out-of-band cache coherency process of FIG. 1.

Processing Data Read Requests:

Referring also to FIG. 3, out-of-band cache coherency process 10 (via one or more of cache management processes $10_1$, $10_2$, $10_3$ & $10_n$.) may receive 200 data read request 32 on a first array (e.g., storage array $14_1$) for requested data stored on SAN 12. Out-of-band cache coherency process 10 may process 202 data read request 32 to determine if the requested data is resident on storage array $14_1$. If the requested data is resident on storage array $14_1$, the requested data may be obtained 204 from a storage device (e.g., data storage device $22_1$ or cache storage device $24_1$) included within storage array $14_1$. If the requested data is not resident on storage array $14_1$, the requested data may be obtained 206 from a storage device included within some other array within SAN 12 (e.g., one of storage arrays $14_2$, $14_3$ & $14_n$) via an out-of-band cache control process.

Specifically and for illustrative purposes, assume that data read request 32 is a request to obtain "File Y" from SAN 12. Assume for the first portion of this example that data read request 32 is provided to storage array $14_1$ and requests "File Y", which is currently stored on storage array $14_1$. Upon receiving 200 data read request 32, out-of-band cache coherency process 10 (via e.g., cache management processes $10_1$) may process 202 data read request 32 to determine if "File Y" is resident on storage array $14_1$.

As discussed above and in this particular example, "File Y" is currently stored on storage array $14_1$. When determining 202 if "File Y" is currently stored on storage array $14_1$, out-of-band cache coherency process 10 may process 208 data location table 28 to determine the location of "File Y" within SAN 12. As discussed above, when a file (e.g., "File X" or "File Y") is stored/moved within SAN 12 (e.g., from a first storage array to a second storage array or between individual storage device of a single storage array, data location table 28 is modified/updated to reflect the location of e.g., "File X" or "File Y". Accordingly, when locating a particular file within SAN 12, out-of-band cache coherency process 10 may process 208 data location table 28 to determine the location of the file sought by the data read request received (i.e., to determine 210 if "File Y" is currently stored on data storage device $22_1$ or to determine 212 if "File Y" currently stored on cache storage device $24_1$).

If, upon processing 204 data location table 28, out-of-band cache coherency process 10 determines that "File Y" is resident on data storage device $22_1$ or cache storage device $24_1$ of storage array $14_1$, out-of-band cache coherency process 10 may obtain 204 "File Y" from the appropriate storage device. Specifically and depending on the actual location of "File Y" within storage array $14_1$, out-of-band cache coherency process 10 may obtain 214 "File Y" from data storage device $22_1$ or obtain 216 "File Y" from cache storage device $24_1$. Once "File Y" is obtained, out-of-band cache coherency process 10 may satisfy read request 32 and provide "File Y" to host 16. If "File Y" is obtained 214 from data storage device $22_1$, cache management processes $10_1$ may place a copy of "File Y" into cache storage device $24_1$ and may modify data location table 28 to define the location of "File Y' within SAN 12 as cache storage device $22_1$.

If the requested data is not resident on storage array $14_k$, the requested data may be obtained 206 from a storage device included within some other array within SAN 12 (e.g., one of storage arrays $14_2$, $14_3$ & $14_n$) via an out-of-band cache control process. For this particular disclosure, an out-of-band cache control process is a process that removes all or a portion of the cache control functionality from the data path within SAN 12. For example, if "File Y" is to be retrieved from a storage array other than the storage array on which data read request 32 was received, dedicated network 26 may be utilized to transfer "File Y" to the other array.

Assume for this portion of this example that "File Y" is not stored on storage array $14_1$ and is actually stored on storage array $14_3$. Accordingly, "File Y" may be obtained 206 from a storage device included within storage array $14_3$ via the out-of-band cache control process. Specifically and depending on the actual location of "File Y" within storage array $14_3$, out-of-band cache coherency process 10 may obtain 218 "File Y" from data storage device $22_3$ or obtain 220 "File Y" from cache storage device $24_3$ via an out-of-band cache control process and dedicated network 26 (or network 18). Once "File Y" is obtained, out-of-band cache coherency process 10 may satisfy read request 32 and may provide "File Y" to host 16. Cache management processes $10_1$ may place a copy of "File Y" into cache storage device $24_1$ and may modify data location table 28 to define the location of "File Y' within SAN 12 as cache storage device $24_1$.

A number of implementations have been described. Nevertheless, it will be understood that various modifications may be made. Accordingly, other implementations are within the scope of the following claims.

What is claimed is:

1. A computer-implemented method comprising:
   receiving a data read request on a first array for requested data stored on a multi-array storage network that includes the first array and at least a second array;
   processing the data read request to determine if the requested data is resident on the first array, including processing a data location table to determine a location of the requested data within the multi-array storage network, wherein the data location table is external to the first array and the at least a second array;
   if the requested data is resident on the first array, obtaining the requested data from a storage device included within the first array;
      wherein processing the data read request to determine if the requested data is resident on the first array includes one or more of:
         determining if the requested data is resident on a cache storage device included within the first array; and
         determining if the requested data is resident on a data storage device included within the first array;
   storing the requested data on the cache storage device included within the first array based upon, at least in part, determining that the requested data is resident on the data storage device included within the first array; and
   if the requested data is not resident on the first array, obtaining the requested data from a storage device included within the at least a second array via an out-of-band cache control process utilizing a dedicated network;
   wherein the data read request is received on the first array before the out-of-band cache control process is triggered;
   wherein the out-of-band cache control process removes at least a portion of cache control functionality from a data path within the multi-array storage network and utilizes the dedicated network to transfer the data.

2. The computer-implemented method of claim 1 wherein obtaining the requested data from a storage device included within the first array includes one or more of:
   obtaining the requested data from a cache storage device included within the at least a second array; and
   obtaining the requested data from a data storage device included within the at least a second array.

3. The computer-implemented method of claim 1 wherein obtaining the requested data from a storage device included within the at least a second array via an out-of-band cache control process includes one or more of:

obtaining the requested data from a cache storage device included within the at least a second array; and obtaining the requested data from a data storage device included within the at least a second array.

4. The computer-implemented method of claim 1 wherein at least one of the storage device included within the first array and the storage device included within the at least a second array is an electromechanical storage device.

5. The computer-implemented method of claim 1 wherein the multi-array storage network includes a third array.

6. A computer program product residing on a computer readable storage medium having a plurality of instructions stored thereon that, when executed by a processor, cause the processor to perform operations comprising:

receiving a data read request on a first array for requested data stored on a multi-array storage network that includes the first array and at least a second array;

processing the data read request to determine if the requested data is resident on the first array, including processing a data location table to determine a location of the requested data within the multi-array storage network, wherein the data location table is external to the first array and the at least a second array;

if the requested data is resident on the first array, obtaining the requested data from a storage device included within the first array;

wherein processing the data read request to determine if the requested data is resident on the first array includes one or more of:

determining if the requested data is resident on a cache storage device included within the first array; and determining if the requested data is resident on a data storage device included within the first array;

storing the requested data on the cache storage device included within the first array based upon, at least in part, determining that the requested data is resident on the data storage device included within the first array; and if the requested data is not resident on the first array, obtaining the requested data from a storage device included within the at least a second array via an out-of-band cache control process utilizing a dedicated network;

wherein the data read request is received on the first array before the out-of-band cache control process is triggered;

wherein the out-of-band cache control process removes at least a portion of cache control functionality from a data path within the multi-array storage network and utilizes the dedicated network to transfer the data.

7. The computer program product of claim 6 wherein the instructions for obtaining the requested data from a storage device included within the first array include instructions for one or more of:

obtaining the requested data from a cache storage device included within the at least a second array; and obtaining the requested data from a data storage device included within the at least a second array.

8. The computer program product of claim 6 wherein the instructions for obtaining the requested data from a storage device included within the at least a second array via an out-of-band cache control process include instructions for one or more of:

obtaining the requested data from a cache storage device included within the at least a second array; and obtaining the requested data from a data storage device included within the at least a second array.

9. The computer program product of claim 6 wherein at least one of the storage device included within the first array and the storage device included within the at least a second array is an electromechanical storage device.

10. The computer program product of claim 6 wherein the multi-array storage network includes a third array.

11. A computer-implemented method comprising:

receiving a data write request on a first array for data to be stored on a multi-array storage network that includes the first array and at least a second array;

processing the data write request to determine if the data is to be stored on the first array or the at least a second array;

initially storing the data on a storage device included within the first array;

updating a data location table with a location of the data within the multi-array storage network, wherein the data location table is external to the first array and the at least a second array;

if the data was determined to be stored on the at least a second array, storing the data on a storage device included within the at least a second array via an out-of-band cache control process utilizing a dedicated network; and if the data is stored on the storage device included within the at least a second array, updating the data location table with the location of the data within the multi-array storage network;

wherein the data write request is received on the first array before the out-of-band cache control process is triggered;

wherein the out-of-band cache control process removes at least a portion of cache control functionality from a data path within the multi-array storage network and utilizes the dedicated network to transfer the data; and wherein storing the requested data on a storage device included within the first array includes storing the data on a cache storage device included within the first array based upon, at least in part, storing the data on a storage device included within the at least a second array via an out-of-band cache control process.

12. The computer-implemented method of claim 11 wherein storing the requested data on a storage device included within the at least a second array via an out-of-band cache control process includes:

storing the data on a storage device included within the at least a second array via an out-of-band cache control process after the data grows cold.

13. The computer-implemented method of claim 11 wherein storing the requested data on a storage device included within the at least a second array via an out-of-band cache control process includes:

storing the data on a data storage device included within the at least a second array via an out-of-band cache control process.

14. The computer-implemented method of claim 11 wherein the multi-array storage network includes a third array.

15. A computer program product residing on a computer readable storage medium having a plurality of instructions stored thereon, which when executed by a processor cause the processor to perform operations comprising:

receiving a data write request on a first array for data to be stored on a multi-array storage network that includes the first array and at least a second array;

processing the data write request to determine if the data is to be stored on the first array or the at least a second array;

storing the data on a storage device included within the first array;

updating a data location table with a location of the data within the multi-array storage network, wherein the data location table is external to the first array and the at least a second array if the data was determined to be stored on the at least a second array, storing the data on a storage device included within the at least a second array via an out-of-band cache control process utilizing a dedicated network; and if the data is stored on the storage device included within the at least a second array, updating the data location table with the location of the data within the multi-array storage network;

wherein the data write request is received on the first array before the out-of-band cache control process is triggered;

wherein the out-of-band cache control process removes at least a portion of cache control functionality from a data path within the multi-array storage network and utilizes the dedicated network to transfer the data; and wherein storing the requested data on a storage device included within the first array includes storing the data on a cache storage device included within the first array based upon, at least in part, storing the data on a storage device included within the at least a second array via an out-of-band cache control process.

16. The computer program product of claim 15 wherein the instructions for storing the requested data on a storage device included within the at least a second array via an out-of-band cache control process include instructions for:

storing the data on a storage device included within the at least a second array via an out-of-band cache control process after the data grows cold.

17. The computer program product of claim 15 wherein the instructions for storing the requested data on a storage device included within the at least a second array via an out-of-band cache control process include instructions for:

storing the data on a data storage device included within the at least a second array via an out-of-band cache control process.

18. The computer program product of claim 15 wherein the multi-array storage network includes a third array.

* * * * *